(12) United States Patent
Watts

(10) Patent No.: US 8,600,702 B2
(45) Date of Patent: Dec. 3, 2013

(54) NON-DESTRUCTIVE THICKNESS MEASUREMENT SYSTEMS AND METHODS

(75) Inventor: Kenneth J. Watts, Alpine, AL (US)

(73) Assignee: United States Pipe and Foundry Company, LLC, Birmingham, AL (US)

(*) Notice: Subject to any disclaimer, the term of this patent is extended or adjusted under 35 U.S.C. 154(b) by 780 days.

(21) Appl. No.: 12/346,151

(22) Filed: Dec. 30, 2008

(65) Prior Publication Data

US 2010/0169043 A1 Jul. 1, 2010

(51) Int. Cl.
*G01B 17/02* (2006.01)

(52) U.S. Cl.
USPC .......................................................... 702/171

(58) Field of Classification Search
USPC .......................................................... 702/171
See application file for complete search history.

(56) References Cited

U.S. PATENT DOCUMENTS

| | | | |
|---|---|---|---|
| 3,411,344 A | 11/1968 | Lloyd | |
| 3,415,307 A | 12/1968 | Schuh et al. | |
| 5,965,818 A | 10/1999 | Wang | |
| 6,078,397 A | 6/2000 | Monchalin et al. | |
| 6,186,004 B1 | 2/2001 | Kaduchak et al. | |
| 6,545,762 B2 | 4/2003 | Lewis et al. | |
| 6,813,951 B2 | 11/2004 | Blouin et al. | |
| 6,837,109 B2 | 1/2005 | Okuno et al. | |
| 7,116,428 B2 | 10/2006 | Sauerland et al. | |
| 7,204,146 B2 | 4/2007 | Ishimaru et al. | |
| 2002/0171846 A1 | 11/2002 | Drake, Jr. | |
| 2006/0156822 A1 | 7/2006 | Heinz et al. | |

FOREIGN PATENT DOCUMENTS

DE 3531975 3/1987

OTHER PUBLICATIONS

Christian U. Grosse, and Hans W. Reinhardt, The Resonance Method—Application of a New Nondestructive Technique Which Enables Thickness Measurements At Remote Concrete Parts, NDTnet—Oct. 1996, vol. 1 No. 10, p. 1-15.*

Berndt, "Non-Destructive Testing Methods for Geothermal Piping," *Office of Wind and Geothermal Technologies, Department of Energy*, Mar. 2001, pp. 1-13, Informal Report BNL-68166, U.S. Department of Energy, Washington D.C. 20585.

\* cited by examiner

*Primary Examiner* — Tung S Lau
(74) *Attorney, Agent, or Firm* — Nathan W. Johnson; Nicholas J. Landau; Bradley Arant Boult Cummings LLP

(57) ABSTRACT

The present invention generally relates to improved non-destructive thickness measurement systems and methods. Embodiments of the present invention utilize quarter wave resonant frequency to measure the thickness of high-temperature pipe walls. In one embodiment, an improved non-destructive thickness measurement system is provided that utilizes Gaussian white noise to produce maximum mechanical resonance in the pipe wall and laser vibrometers to detect the pipe wall's maximum displacement.

13 Claims, 5 Drawing Sheets

NON-DESTRUCTIVE THICKNESS MEASUREMENT SYSTEMS AND METHODS

FIELD OF THE INVENTION

The present invention relates to systems and methods for evaluating attributes of an item. More particularly, embodiments of the present invention use non-destructive techniques to measure the thickness of items by applying vibrations to the item and monitoring the results.

BACKGROUND OF THE INVENTION

A common obstacle faced by pipe manufacturers is the monitoring of the uniformity of pipe wall thickness during the manufacturing process. Ductile iron pipe is centrifugally cast by pouring molten iron down a U-shaped trough into an externally water-cooled rotating steel mold. The casting machine traverses the length of the trough as molten iron fills the bell cavity and body of the mold. This casting method is known as the deLavaud process. When the pipe is extracted from the mold, its temperature is approximately 1000° F. Due to the brittle nature of the pipe at this point in the manufacturing process, it must be annealed. In the annealing cycle, the pipe is placed in a furnace, where it is heated to temperatures of approximately 1700° F.

During the manufacturing process, particular attention is paid to the uniformity of thickness of the pipe wall after casting. A common technique used to measure pipe wall thickness has been the time-of-flight method. This technique uses a couplant applied to the surface of the pipe and a transducer to send an ultrasonic wave through the couplant into the outer surface of the pipe wall. The transducer then receives the ultrasonic wave after it has reflected from the inner surface of the pipe wall and passed through a couplant. Thickness is ultimately determined by measuring the time between the sending of the ultrasonic pulse and receipt of the reflected pulse.

Although this technique can be useful in measuring pipe wall thickness when the pipe is at a relatively low temperature, high-temperature pipes are not typically measured using the time-of-flight method due to the inability of typical coupling mediums such as oil, water, and glycerin to withstand the high surface temperatures of the pipe walls. Thus, a pipe exiting the casting process at a temperature of approximately 1000° F. or higher must first be cooled before it can be subjected to a time-of-flight measurement. Because this technique requires cooling in order to measure pipe thickness in-process, there is an inherent delay in providing feedback to the casting system. Further, cooling the pipe for thickness measurement would require greater energy to reheat the pipe during the annealing process. What are needed are systems and methods for providing in-process thickness data for use in the casting process.

BRIEF SUMMARY OF THE INVENTION

Embodiments of the present invention provide systems and methods for nondestructively measuring the thickness of items. In one embodiment, a system for measuring thickness of an object having an outer surface and a temperature greater than approximately 1000° F. is provided. The system includes a vibration application mechanism configured to apply a vibration to the object having a temperature greater than approximately 1000° F.; a vibration monitoring device configured to gather displacement and frequency data for a discrete location on the outer surface of the object; and a data processing system configured to determine a resonant frequency of the object based at least in part on the displacement and frequency data gathered by the vibration monitoring device and to calculate the thickness of the object at the discrete location based at least in part on the resonant frequency.

In another embodiment, a method for measuring thickness of an object having an outer surface and a temperature greater than approximately 1000° F. is provided. The method includes the steps of: applying a vibration to the object, wherein the vibration is Gaussian white noise; gathering displacement and frequency data for a discrete location on the outer surface of the object; determining the resonant frequency of the object based at least in part on the displacement and frequency data; and calculating the thickness of the object at the discrete location based at least in part on the resonant frequency.

In a further embodiment, a system for measuring thickness of an object having an outer surface is provided. The system includes a vibration application mechanism configured to apply a vibration to the object wherein the vibration comprises white noise having a predetermined frequency range; a vibration monitoring device configured to gather displacement and frequency data for a discrete location on the outer surface of the object; and a data processing system configured to determine a resonant frequency of the object based at least in part on the displacement and frequency data gathered by the vibration monitoring device and to calculate the thickness of the object at the discrete location based at least in part on the resonant frequency.

DETAILED DESCRIPTION OF THE INVENTION

The present invention will now be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

General Operation and Structure

Figure 4:
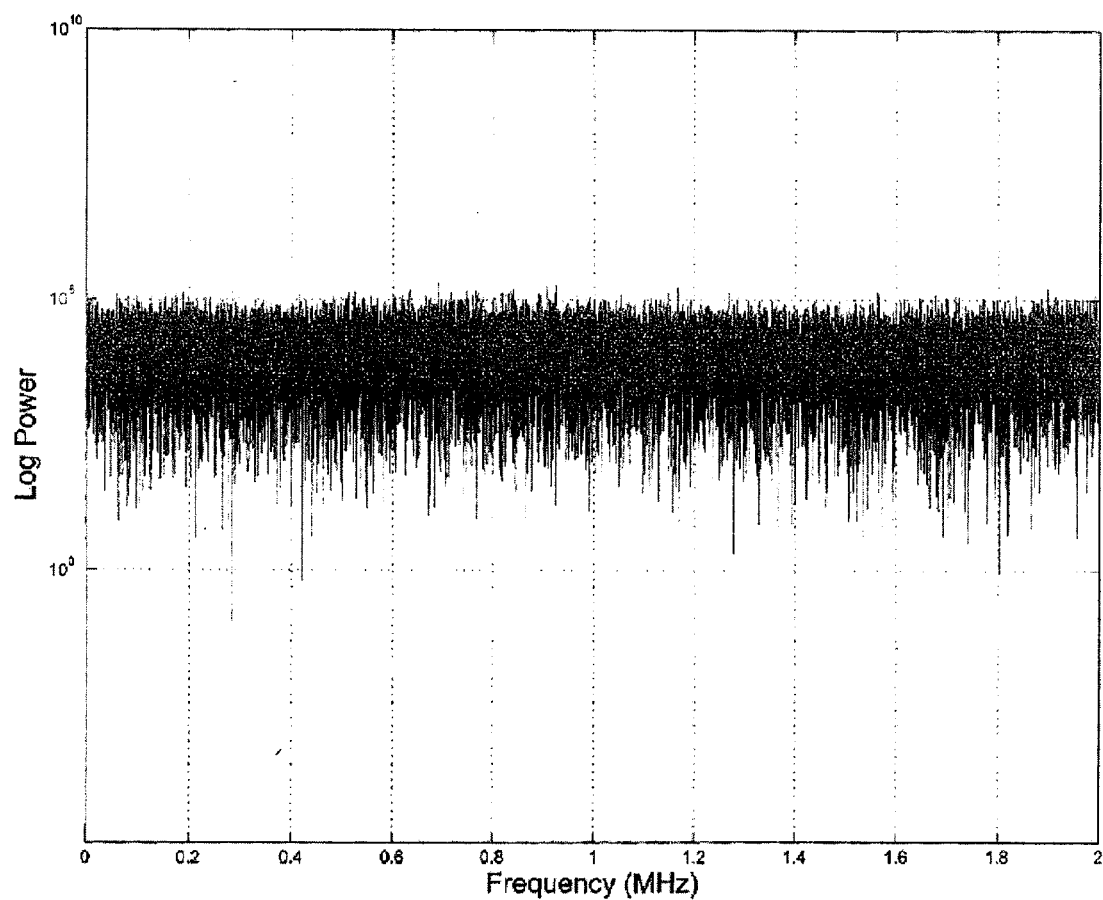
FIG. 4 is a plot of white noise input frequencies and powers according to an embodiment of the present invention.

Embodiments of the present invention provide systems and methods for non-destructively measuring the thickness of pipes that address deficiencies in the pipe casting industry, some of which are discussed above. Generally described, embodiments of the present invention excite the pipe wall being measured with white noise having a predetermined frequency range. An example of white noise is shown in FIG. 4, which depicts a signal having multiple frequencies at a substantially constant power.

A quarter wave resonant cavity is formed by the pipe wall 5. The pipe wall's inner surface 7 and the outer surface 6 both share a boundary with the surrounding air and form the boundaries of the resonant cavity. When the pipe 4 is excited by vibration from an external source, a standing wave may form within the resonant cavity.

Figure 1:
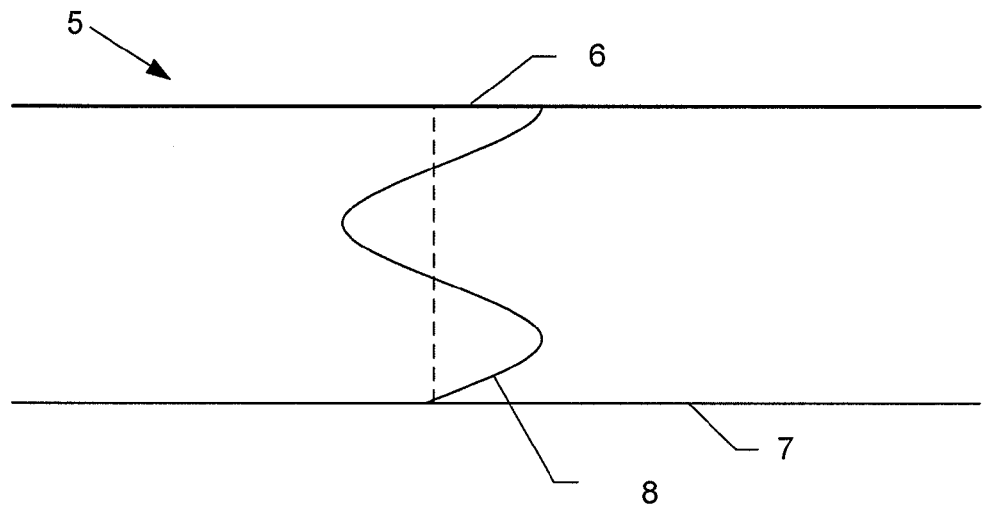
FIG. 1 is a schematic diagram of a cross-section of a portion of a pipe wall illustrating how ultrasonic vibrations interact within the pipe wall.

FIG. 1 illustrates the mechanics of resonance within a pipe wall 5. In various embodiments of the present invention, a pipe wall is excited with white noise, which includes a range of frequencies each having approximately the same power. When the excitation applied to the pipe wall 5 matches the pipe wall's resonant frequency 8, resonance occurs, and the pipe wall 5 experiences its greatest displacement.

The frequency of a standing wave in the cavity, which is determined by measuring the quarter wave resonant frequency of the cavity, can be used to determine the dimension of the cavity at a point of measurement. The quarter wave resonant frequency of a particular location on the pipe wall 5 can be determined by finding the frequency corresponding with the greatest displacement of the pipe wall 5 at that particular location.

The quarter wave resonant frequency of the cavity formed by the inside diameter and the outside diameter pipe walls may be calculated using the following equation:

$$f = \frac{(2n-1)}{4}\frac{V}{d}.$$

In this formula, "n" is a positive integer representing the wave number. Thus, for any given value of "n," the resonant frequency ("f") equals a multiple of one-fourth times the velocity of the wave ("V"), divided by the thickness of the pipe ("d").

The "n" value for a type of item (e.g., a ductile iron pipe) can be determined by testing an item of known thickness and then solving the above formula for "n" as indicated below.

$$n = 2\left(\frac{df}{V} + \frac{1}{4}\right)$$

For example, the "n" can be determined for a ductile pipe having a known thickness of 0.35 inches. As will be understood by those skilled in the art, the velocity "V" of a longitudinal ultrasonic wave through a ductile iron pipe is 211,400 inches/second. The resonant frequency of the pipe can be determined using embodiments of the present invention as described in greater detail below. After performing such a test, the resonant frequency ("f") is approximately 716,000 Hz for a pipe of this material and thickness. Entering these values into the equation above, the resulting value of "n" is 2.87. Rounded to the closest integer, "n" is 3 for ductile pipe with a thickness of approximately 0.35 inches. Thus, for ductile pipe with a thickness of approximately 0.35 inches, the resonant frequency can be calculated using the following reduced formula:

$$f = \frac{1.25V}{d}$$

Figure 2:
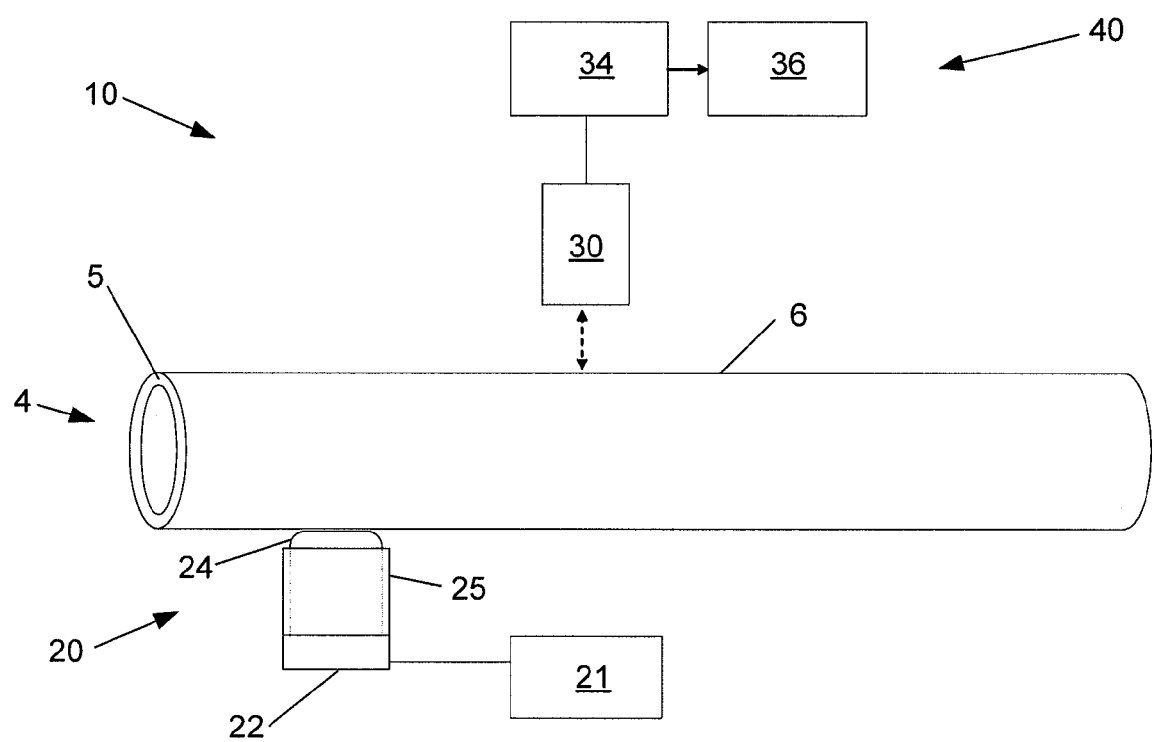
FIG. 2 is a schematic diagram of a non-destructive thickness measurement system 10 in accordance with an embodiment of the present invention.

FIG. 2 illustrates a non-destructive testing system 10 in accordance with an embodiment of the present invention. The system 10 may be used to measure the thickness of a pipe wall 5 such as during the pipe casting process where the pipe temperature may be 1000° F. or greater. Although the following paragraphs described various embodiments of the present invention in the context of a ductile iron pipe, it should be understood that embodiments of the present invention may be used on pipes constructed of any material including plastic, steel, and aluminum. Also, embodiments of the present invention may be used to measure the thickness of other items.

The system 10 includes a vibration application mechanism 20, a vibration monitoring device 30 and a data processing system 40. Generally described, the vibration application mechanism 20 applies a vibration to the pipe at one location. The vibration monitoring device 30 monitors the displacement of the pipe resulting from the applied vibration at a second location. Displacement information from the vibration monitoring device 30 is then analyzed by the data processing system 40 to determine the thickness of the pipe wall at the monitored location.

Vibration Application Mechanism 20

The vibration application mechanism 20 includes a signal generator 21, a vibration generator 22 and a couplant 24 housed in a container 25. In various embodiments, the signal generator 21 creates a white noise signal, which is applied to the pipe wall 5 through the vibration generator 22 and the couplant 24. In various embodiments, the vibration generator 22 may be a piezoelectric transducer. Depending on the environment in which the item is being measured, the vibration generator 22 may use a high-temperature transducer. The transducer converts the signal received from the signal generator 21 into a vibration, thereby generating ultrasonic energy that is transmitted into the pipe wall 5 through the couplant 24.

In some embodiments, the signal generator 21 may generate white noise having a Gaussian, or normal, frequency distribution. Compared to other types of noise signals, Gaussian white noise can be useful for data-gathering because its frequency values are independent of each other. Furthermore, a benefit of using white noise to excite the pipe is its efficiency over alternative methods of applying vibration, such as applying a sweep of varying frequencies. With a white noise signal, a range of frequencies are provided as a single input versus a frequency sweep input, which requires a constantly changing signal frequency.

In various embodiments, the range of frequencies of the applied white noise is predetermined. This range may be determined based on the expected pipe wall thickness range of the pipes to be measured and the material of the pipe using the following formula:

$$f = \frac{nV}{d}$$

In this formula, the frequency ("f") equals the resonant harmonic ("n") times the speed of sound in the pipe material ("V") divided by the expected thickness ("d"). As noted above, "n" may be found by testing a pipe of known thickness. To determine the frequency range, the respective frequencies for a predetermined possible minimum and maximum thickness for a given pipe may be calculated.

The vibration generator 22 is operatively connected to a couplant 24, which facilitates the transmission of ultrasonic white noise from the transducer into the pipe wall. In low-temperature embodiments, the couplant 24 may be oil, water or glycerin. These substances, however, cannot operate in high temperature applications (e.g., greater than 600° F.). For high-temperature applications, embodiments of the present invention may use molten metal or graphite couplants.

In the illustrated embodiment, a molten metal couplant 24 is used to facilitate the transfer of ultrasonic white noise from the vibration generator 22 to the pipe wall 5. The molten metal couplant 24 is housed in a container 25. In various embodiments, the container 25 is a refractory container heated to a temperature capable of maintaining the molten state of the couplant. The container 25 is filled with molten couplant 24 such that a negative meniscus is formed proximate the rim of the container. In some embodiments, the meniscus extends beyond the rim of the container 25. The container 25 is then positioned under the pipe such that at least the maximum point of the meniscus formed by the molten couplant 24 makes contact with the outer surface 6 of the pipe. In some embodiments, the container 25 may also make contact the outer surface 6 of the pipe; in other embodiments, it may not. It is not believed that contact between the container 25 and the outer surface 6 of the pipe during operation of the system 10 affects the accuracy of the results.

In some embodiments, molten tin (Sn) is used as the molten couplant, and the container 25 maintains the tin at a temperature of approximately 600° F. In other embodiments, ceramic powders or other types of high-temperature couplants may be used in connection with the present invention as opposed to molten metal.

Vibration Monitoring Device 30

The vibration monitoring device 30 monitors the pipe's reaction to the applied vibration at a discrete location. The monitoring device 30 is positioned to gather vibration data from a position spaced apart from the vibration application mechanism 20. The monitoring device 30 gathers displacement data as a function of time from that position. For example, the monitoring device 30 may gather displacement data at regular time intervals such as, for example, every 5 nanoseconds. In various embodiments, the monitoring device 30 uses non-contact monitoring techniques, such as a laser vibrometer, to gather the vibration data. In other embodiments, the monitoring device 30 may directly contact the exterior pipe wall 6 to gather the vibration data. Monitoring devices 30 that make direct contact with the exterior pipe wall 6 may use molten couplants and piezoelectric transducers or other known techniques for gathering vibration data from an object. In some embodiments, more than one monitoring device may be used to gather displacement at multiple locations simultaneously. In other embodiments, one or more monitoring devices may be moved along the pipe to gather data from multiple locations.

Data Processing System 40

Operatively connected to the monitoring device 30 is the data processing system 40, which processes the gathered data to arrive at a thickness of the pipe at the monitored location. The data processing system 40 includes a signal processor 34, which analyzes the displacement data and a thickness analyzer 36, which calculates the thickness of the pipe at the monitored location based on the results received from the signal processor 34.

The signal processor 34 receives the displacement data from the monitoring device 30 and performs a fast Fourier transfer ("FFT") to determine the frequency of the vibration. Using the results of the FFT, the resonant frequency is identified as the frequency with the greatest corresponding power (see, e.g., FIG. 6). The resonant frequency is then transmitted to the thickness analyzer 36.

Using the determined resonance value, the thickness analyzer 36 calculates the pipe thickness using the following formula:

$$\text{thickness} = \frac{nV}{f}$$

In this formula, the thickness of the pipe wall equals the resonant harmonic ("n") times the speed of sound in the pipe material ("V") divided by the resonant frequency ("f").

Figure 3:
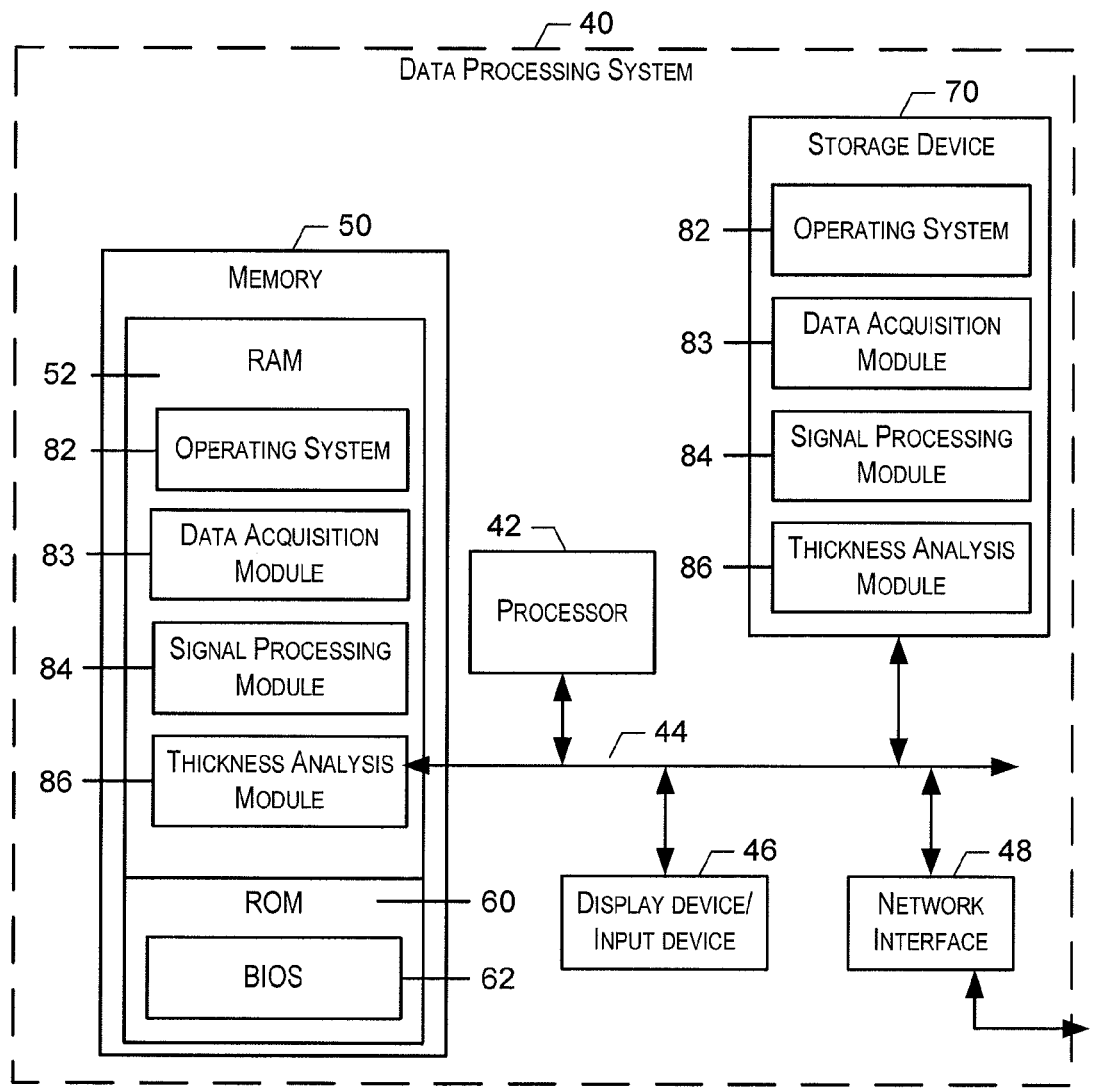
FIG. 3 is a schematic diagram of a data processing system 40 in accordance with an embodiment of the present invention.

FIG. 3 is a schematic diagram of the data processing system 40 according to one embodiment of the invention is shown, where the function of the signal processor 34 and the thickness analyzer 36 are performed by modules of a single processing system. In this embodiment, the data processing system 40 may include a processor 42 that communicates with other elements within the data processing system 40 via a system interface or bus 44. Also included in the data processing system 40 may be a display device/input device 46 for receiving and displaying data. This display device/input device 46 may be, for example, a keyboard or pointing device that is used in combination with a monitor. A network interface 48, for interfacing and communicating with other elements of a computer network (e.g., signal generator 21, vibration generator 22), may also be located within the data processing system 40. For example, the data processing system 40 may communicate with the signal generator 21 to initiate input of a white noise. It may further be configured to indicate when the resonant frequency or thickness calculations have stabilized and to instruct the signal generator to cease generating the white noise.

The data processing system 40 may further include memory 50, which may include both read only memory (ROM) 60 and random access memory (RAM) 52. The server's ROM 60 may be used to store a basic input/output system (BIOS) 62, containing the basic routines that help to transfer information between elements within the data processing system 40. In addition, the data processing system 40 may include at least one storage device 70, such as a hard disk drive, a floppy disk drive, a CD-ROM drive, or optical disk drive, for storing information on various computer-readable media, such as a hard disk, a removable magnetic disk, or a CD-ROM disk. As will be appreciated by one of ordinary skill in the art, each of these storage devices 70 may be connected to the system bus 44 by an appropriate interface. The storage devices 70 and their associated computer-readable media may provide nonvolatile storage for a personal computer. It is important to note that the computer-readable media described above could be replaced by any other type of computer-readable media known in the art. Such media may include, for example, magnetic cassettes, flash memory cards, digital video disks, and Bernoulli cartridges.

A number of program modules including, for example, an operating system 82, may be stored by the various storage devices and within RAM 52. According to one embodiment, the data processing system 40 may store a data acquisition module 83, a signal processing module 84, and a thickness analysis module 86, wherein the data acquisition module 83, signal processing module 84, and the thickness analysis module 86 may control certain aspects of the operation of the data processing system 40, with the assistance of the processor 42 and the operating system 82.

According to one embodiment of the present invention, the data acquisition module 83 may receive an analog signal from the vibration application mechanism 20, digitize the analog signal, and store the resultant data points. In some embodiments, the data acquisition module 83 may be a data acquisition card installed in the data processing system 40 in communication with the bus 44.

The signal processing module 84 may, among other things, be configured to receive and analyze the displacement data gathered by the monitoring device 30. Due to a phenomenon known as spectral leakage, in which the sudden onset and offset of the signal at the ends of the sampling range distorts the frequency analysis of a non-integral number of cycles, the signal processing module 84 may apply a Hanning window function to the data sample before subjecting it to any further analysis. By reducing the size of the signal at the edges, the Hanning window combats spectral leakage by essentially smoothing the data points at the beginning and end of the sampling range. As will be understood by those skilled in the art, other embodiments may not include the application of a Hanning window.

The signal processing module may also be configured to perform an FFT on the displacement data received from the monitoring device 30. An FFT is essentially an operation that transforms the range of data samples from their time-domain representation into a frequency-domain representation. The resulting analysis may be output to a display device 46 (see e.g., FIG. 6). The signal processing module 84 may be further configured to identify the frequency representing the highest power reading, which corresponds with the natural or resonant frequency of the pipe at the monitored location.

The thickness analysis module 86 may be configured to receive the resonant frequency determined by the signal processing module 84 and calculate the thickness of the pipe at the monitored location. Specifically, the thickness analysis module 86 multiplies the speed of sound within the pipe material times the resonant harmonic (1.25) divided by the resonant frequency to arrive at the thickness of the pipe.

As will be understood by those skilled in the art, the signal processor's and the thickness analyzer's functions may be modules of a single computing device as illustrated in FIG. 3 or in stand alone computing devices. Furthermore, the functions of the signal processing module and the thickness module may be combined into a signal module.

Method for Measuring Thickness

The following paragraphs describe methods of measuring pipe wall thickness for a ductile iron pipe at a discrete location in accordance with an embodiment of the present invention. It should be understood, however, that the various methods described may be used to measure thicknesses of any type of item.

The method begins with the receipt of a pipe from the ductile iron casting process. In various embodiments, the pipe 4 received may have a temperature of approximately 1000° F. A couplant 24 is then applied to the outer surface of the pipe 6. As will be understood by those skilled in the art, the couplant may be applied at any position along the length of the pipe. Because the pipe 4 has a temperature approximately 1000° F. or more, the couplant 24 in this embodiment is a molten metal such as tin (Sn). The couplant 24 is housed in a container 25, which is moved proximate the pipe such that the couplant 24 contacts the outer surface 6 of the pipe. In other embodiments, the couplant 24 may be a ceramic powder or other high-temperature couplant material.

Next, the signal generator 21 transmits a signal to the vibration generator 22, which converts the signal into a mechanical vibration. The mechanical vibration travels through the couplant 24 and into the pipe wall 5. The signal may be a multiple frequency mechanical vibration, which is applied to the pipe 4 through the couplant 24. This process may be in the form of ultrasonic white noise. In some embodiments, the white noise may be filtered to obtain a Gaussian distribution (i.e. Gaussian white noise) having a predetermined minimum and maximum frequency range. In various embodiments, the frequency range is determined based upon the desired thickness of the pipe wall 5.

Simultaneously, the vibration monitoring device 30, at a position spaced apart from the vibration application mechanism 20, monitors the pipe's reaction to the applied vibration. In some embodiments, a laser vibrometer is used to monitor the movement of the pipe wall during a given time period. In some embodiments, the vibration monitoring device 30 generates an analog signal indicating the movement of the pipe wall, and this signal is digitized by the data acquisition module. The resulting data points may be stored for later analysis. In some embodiments, 2 million data point samples are gathered in 10 milliseconds. In various embodiments, the vibration generator 22 continues to apply a vibration to the pipe 4 until the vibration data gathered by the monitoring device has stabilized.

The vibration monitoring device 30 then transmits the data to the data processing system 40, which performs a series of calculations on the sample data points in order to determine the frequency with the greatest corresponding power. In various embodiments, the data is subjected to an FFT. The FFT transforms the range of data samples from their time-domain format into a frequency-domain format (see, e.g., FIG. 5). In some embodiments, a Hanning window is applied to the data before performing the FFT analysis.

Using the results of the FFT, the thickness of the pipe wall at the monitored location may be calculated by multiplying the resonant harmonic of 1.25 times the speed of sound in the pipe material divided by the resonant frequency. In various embodiments of the present invention, the pipe 4 may then be rotated 180° around its longitudinal axis to monitor the thickness at a different location.

EXAMPLE

The following non-limiting example illustrates various aspects of some embodiments of the present invention.

Figure 5:
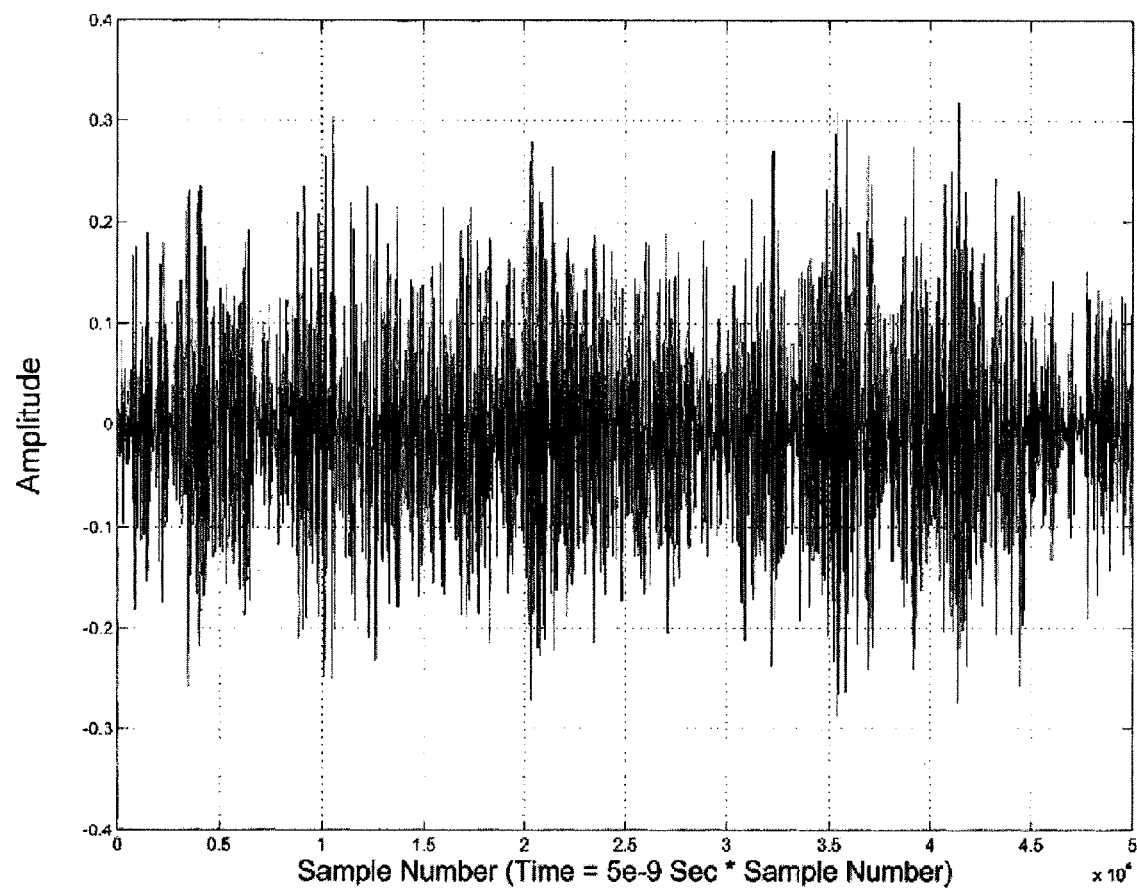
FIG. 5 is a plot of a portion of the vibration data gathered by a monitoring device 30 of a pipe with the white noise of FIG. 4 applied.
Figure 6:
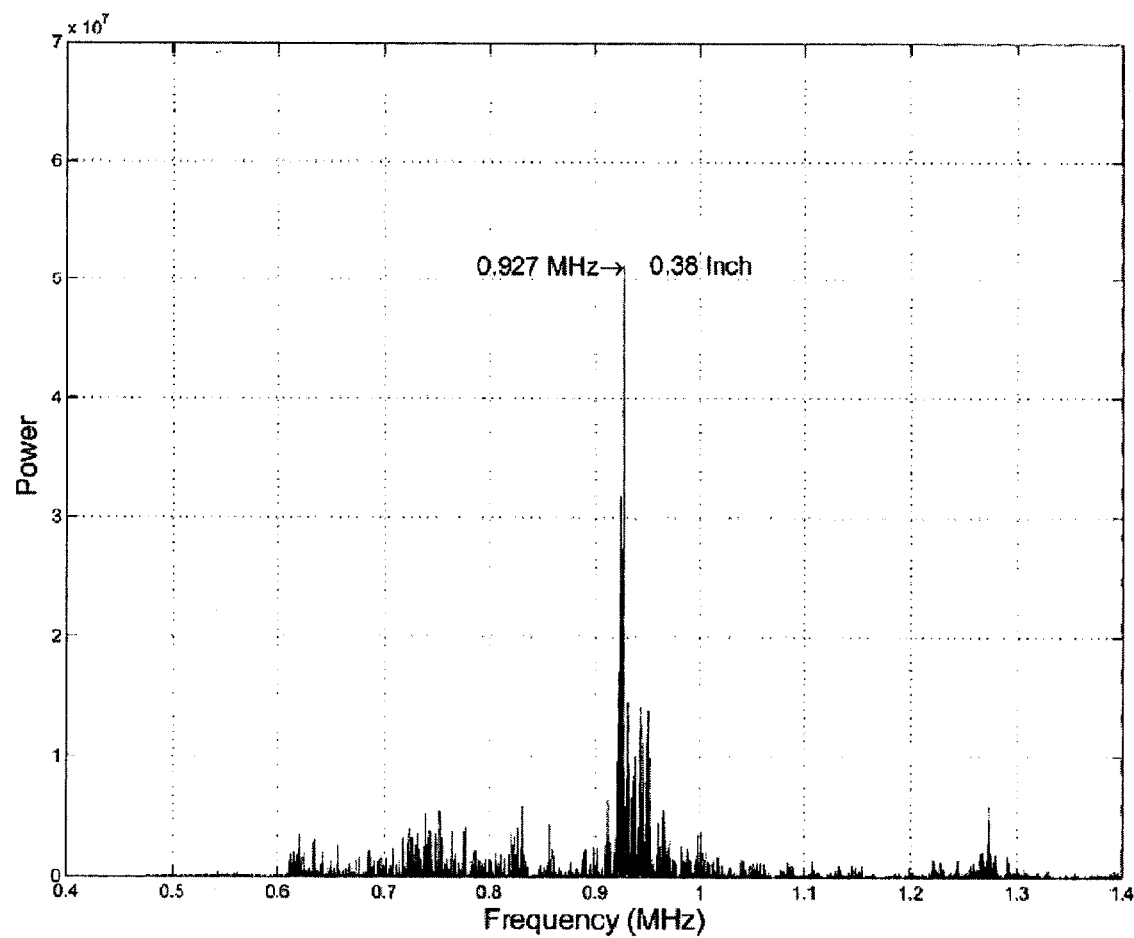
FIG. 6 is a plot of the results of an FFT as applied to the data in FIG. 5.

FIGS. 4-6 illustrate data collected during a test of an annealed 6 inch ductile iron pipe at ambient temperature using an embodiment of the present invention. The desired thickness for the 6 inch pipe is approximately 0.35 inches. A vibration was applied to the pipe using a first piezoelectric transducer operating through a couplant. The reaction of the pipe was monitored using a second piezoelectric transducer.

FIG. 4 illustrates the white noise signal generated by a signal generator 21 in that trial. As can be seen, the white noise includes signal components of various frequencies with all of the frequencies having substantially the same power. As illustrated, the frequency range for this pipe was 0 to 2 MHz.

The white noise generated by the signal generator 21 was communicated to the first piezoelectric transducer, which applied a vibration into the pipe. As noted, the reaction of the pipe was monitored using the second piezoelectric transducer.

FIG. 5 depicts a portion of the output from the second piezoelectric transducer, which measured the displacement of the pipe in response to the white noise input. Specifically, FIG. 5 represents the first 50,000 acquired data points on the 6 inch diameter ductile iron pipe in response to the white noise input shown in FIG. 3.

For this test, the total number of data samples was $2^{21}$, or 2,097,152 data points. The samples were taken at intervals of 5 nanoseconds and the total data sampling period was 10.48 milliseconds (i.e. $5 \times 10^{-9}$ seconds*2,097,152 data samples). FIG. 5 depicts, in the time-domain, a sequence of the first 50,000 of 2,097,152 data points.

FIG. 6 illustrates the results of an FFT performed on data points, which have been gathered by the second piezoelectric transducer and digitized by the high speed data acquisition card. As can be seen, maximum displacement of the 6 inch pipe occurred at 0.927 MHz. Using the formula described above, the thickness of the pipe at the measured location was determined to be 0.38 inches. Specifically, the thickness equaled the wave harmonic (1.25) times the velocity of sound in annealed ductile iron (297,984 inches per second), divided by the resonant frequency.

As compared to other methods of measuring thickness in the prior art, the various embodiments of the present invention are more accurate and efficient. One of the many notable advantages of various embodiments of the present invention is that the inaccuracy associated with the time-of-flight method of testing thickness is avoided. In time-of-flight measurements, error is introduced because the signal passes through two different materials (i.e. the pipe wall 5 and the couplant 24) which have different signal transmission speeds. These different transmission speeds can adversely affect the time of flight of the transmitted signal. This source of error is eliminated by embodiments of the present invention because the couplant 24 is only used to facilitate transmission of the ultrasonic vibration and does not impact the monitored vibration data.

Furthermore, using techniques described herein, high-temperature pipes can be measured, thereby reducing the need to cool the pipes before measuring their thickness. This improves the ability of pipe manufacturers to monitor their casting process. In addition, as compared to other methods of measuring thickness in the prior art, various embodiments of the present invention provide rapid feedback of pipe data to the casting machine control system, thereby optimizing the use of materials in the pipe manufacturing process.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system for measuring thickness of an object having an outer surface comprising:
    a vibration application mechanism configured to apply a vibration to the object wherein the vibration comprises white noise having a predetermined frequency range that is less than the entire white noise spectrum;
    a vibration monitoring device configured to gather displacement data for a discrete location on the outer surface of the object; and
    a data processing system configured to determine a resonant frequency of the object based at least in part on the displacement data gathered by the vibration monitoring device and to calculate the thickness of the object at the discrete location based at least in part on the resonant frequency;
    wherein the data processing system is further configured to calculate the wave number ("n") by solving the equation:

$$n = 2\left(\frac{d_{ref} * f_{ref}}{V_{ref}} + \frac{1}{4}\right)$$

where $d_{ref}$ is a known thickness of a reference object, $f_{ref}$ is a resonant frequency of the reference object, and $V_{ref}$ is a velocity of a wave through the reference object, wherein the object and the reference object comprise the same material; and
    calculate the thickness of the object by solving the equation:

$$d = \frac{(2n-1)V}{4f}$$

where V is equal to $V_{ref}$ and f is equal to $f_{ref}$.

2. The system of claim 1 further comprising a couplant to facilitate the transfer of vibration from the vibration application mechanism to the object.

3. The system of claim 1, wherein the white noise has a Gaussian distribution, the Gaussian distribution having frequency values that are independent of each other.

4. The system of claim 1, further comprising a second vibrometer configured to gather displacement data for a second discrete location on the surface of the object.

5. The system of claim 1, wherein the vibration application mechanism is a transducer configured to operate at a temperature over 1000 degrees F.

6. The system of claim 1, wherein the vibration monitoring device is a laser vibrometer.

7. The system of claim 1, wherein the data processing system is further configured to transform the displacement data into a frequency-domain format using a Fast Fourier Transform (FFT) analysis.

8. The system of claim 1, wherein the object is a ductile iron pipe.

9. The system of claim 1, wherein the predetermined frequency range is based at least in part on a range of expected thicknesses of the object and a material of the object.

10. The system of claim 2, wherein the couplant is molten metal.

11. The system of claim 3, wherein the vibration application mechanism is further configured to filter the white noise to obtain the Gaussian distribution.

12. The system of claim 7, wherein the data processing system is further configured to apply a Hanning window to the displacement data before the FFT analysis.

13. The system of claim 9, wherein a minimum frequency of the predetermined frequency range is based at least in part on a maximum thickness of the object and a maximum frequency of the predetermined frequency range is based at least in part on a minimum thickness of the object.

* * * * *